United States Patent
Sodano

(10) Patent No.: US 11,180,599 B2
(45) Date of Patent: Nov. 23, 2021

(54) POLYISOCYANURATE BASED POLYMERS AND FIBER REINFORCED COMPOSITES

(71) Applicant: Henry A Sodano, Ann Arbor, MI (US)

(72) Inventor: Henry A Sodano, Ann Arbor, MI (US)

(73) Assignee: TRIMER TECHNOLOGIES, LLC, Ann Arbor, MI (US)

( * ) Notice: Subject to any disclaimer, the term of this patent is extended or adjusted under 35 U.S.C. 154(b) by 0 days.

(21) Appl. No.: 17/029,998

(22) Filed: Sep. 23, 2020

(65) Prior Publication Data
US 2021/0002409 A1    Jan. 7, 2021

Related U.S. Application Data

(63) Continuation of application No. PCT/US2019/065711, filed on Dec. 11, 2019.

(60) Provisional application No. 62/777,792, filed on Dec. 11, 2018.

(51) Int. Cl.
| | |
|---|---|
| *C08G 18/02* | (2006.01) |
| *C08G 18/00* | (2006.01) |
| *C08G 59/06* | (2006.01) |
| *C08L 63/00* | (2006.01) |
| *C08L 75/04* | (2006.01) |

(52) U.S. Cl.
CPC ......... *C08G 18/022* (2013.01); *C08G 18/003* (2013.01); *C08G 59/06* (2013.01); *C08L 63/00* (2013.01); *C08L 75/04* (2013.01)

(58) Field of Classification Search
CPC .... C08G 18/022; C08G 18/003; C08G 59/06; C08L 63/00; C08L 75/04
See application file for complete search history.

(56) References Cited

U.S. PATENT DOCUMENTS

| | | | |
|---|---|---|---|
| 3,676,380 A | 7/1972 | McLaughlin et al. | |
| 3,793,236 A | 2/1974 | Ashida et al. | |
| 3,817,939 A | 6/1974 | Allen et al. | |
| 4,070,416 A | 1/1978 | Narahara et al. | |
| 4,359,541 A | 11/1982 | Patton, Jr. et al. | |
| 4,359,550 A | 11/1982 | Narayan et al. | |
| 4,382,125 A | 5/1983 | Narayan et al. | |
| 4,456,709 A | 6/1984 | Richter et al. | |
| 4,516,761 A | 5/1985 | Richter et al. | |
| 4,564,651 A | 1/1986 | Markert et al. | |
| 4,568,701 A | 2/1986 | Hopkins, Jr. | |
| 4,855,383 A * | 8/1989 | Dammann ........... C08G 18/022 528/51 |
| 5,036,135 A | 7/1991 | Von Gentzkow et al. | |
| 5,053,274 A * | 10/1991 | Jonas ...................... E04F 13/18 428/332 |
| 6,028,158 A | 2/2000 | Stack et al. | |
| 6,063,891 A | 5/2000 | Stack et al. | |
| 6,294,117 B1 | 9/2001 | Rosthauser et al. | |
| 6,515,125 B1 | 2/2003 | Slack et al. | |
| 6,617,032 B2 | 9/2003 | Rickner et al. | |
| 8,501,877 B2 | 8/2013 | Zhao et al. | |
| 9,334,379 B2 | 5/2016 | Lindner et al. | |
| 9,816,008 B2 | 11/2017 | Aou et al. | |
| 2005/0038222 A1 | 2/2005 | Joshi et al. | |
| 2010/0151138 A1 | 6/2010 | Occhiello et al. | |
| 2015/0158967 A1 | 6/2015 | Esbelin et al. | |
| 2018/0051119 A1 | 2/2018 | Holtgrewe et al. | |

FOREIGN PATENT DOCUMENTS

| | | | | |
|---|---|---|---|---|
| CA | 3019657 A1 * | 11/2017 | ........... | C08G 18/225 |
| CN | 103012713 A | 4/2013 | | |
| CN | 103568337 A | 2/2014 | | |
| EP | 0226176 B1 | 4/1993 | | |
| EP | 0643086 A1 | 3/1995 | | |
| EP | 3189088 B1 | 4/2020 | | |
| WO | 2020123640 A1 | 6/2020 | | |

OTHER PUBLICATIONS

Written Opinion and International Search Report issued by the International Searching Authority for PCT Application PCT/US19/65711, dated Feb. 27, 2020.

* cited by examiner

*Primary Examiner* — Rabon A Sergent
(74) *Attorney, Agent, or Firm* — Gregory D. Degrazia; Miller, Canfield Paddock & Stone PLC

(57) ABSTRACT

The present invention relates to a reaction mixture including one or more polyfunctional isocyanates such that the average isocyanate functionality of the mixture is greater than 2.1, and a catalyst composition including at least one trimerization catalyst and at least one epoxide group; and curing the reaction mixture to give a cured polymer composition made up of the reaction product of isocyanates with themselves.

23 Claims, 3 Drawing Sheets

POLYISOCYANURATE BASED POLYMERS AND FIBER REINFORCED COMPOSITES

PRIOR APPLICATIONS

The present application claims priority as a continuation application of Patent Cooperation Treaty Application No. PCT/US2019/065711 filed on Dec. 11, 2019 that claims priority to U.S. Provisional Patent Application No. 62/777,792 filed on Dec. 11, 2018, the contents both of which are included herein by reference.

TECHNICAL FIELD

The present invention relates generally to a predominately isocyanate reaction mixture. More specifically, the present invention relates to a predominately isocyanate reaction mixture that includes polymeric methylene diphenyl diisocyanate (pMDI) which upon curing results in a polymer with high strength, high strain to failure, high fracture toughness and high glass transition temperature.

BACKGROUND

Isocyanurates are formed through the trimerization of three isocyanates and have been widely used for decades to increase the thermal stability of polyurethanes, epoxies and polyureas. Isocyanurates are also widely used in the production of foams due to their excellent flammability resistance, however high density polymers based essentially on polyisocyanurates alone have not found use without the formation of additional linkages which act to increase the toughness of the polymer. To overcome a defect widely known as friability of polyisocyanurate foams or brittleness, polyisocyanurates have required an inclusion of high percentages of reactants that consume isocyanate groups and limit the fraction of isocyanurates in the polymer. For example, U.S. Pat. No. 4,568,701A describes the use of "4% to 20% by weight of the foam formulation of a surface active organic silicone compound characterized by an active hydrogen functionality, and having a hydroxyl number of greater than about 50 and an equivalent weight of less than about 2,000 and a plasticizing amount of a nonvolatile organic plasticizer" to decrease the friability of the foam. U.S. Pat. No. 3,676,380A describes the use of 1 to 10% of an aliphatic diol to form polyurethane linages which increase the elasticity of the polymer. U.S. Pat. No. 3,793,236 describes trimerizing an isocyanate-terminated polyoxazolidone prepolymer by means of a trimerization catalyst such as a tertiary amine. The inventors describe the resulting polymer as exhibiting low friability and high flame resistivity due to the incorporation of oxazolidone linkages. CN Pat. App. Pub. No. 103,012,713A discloses that foams with a high degree of pure polyisocyanurate crosslinking density have very brittle properties and "no practical value." The inventors use 10-50% epoxy resin to achieve reduced brittleness.

When polyisocyanurates are used in the production of dense plastics with a low void content, the materials are widely known to be brittle without the incorporation of linear bonds, chain extenders or flexible groups that act to increase toughness, i.e. oxazolidones disclosed in U.S. Pat. Nos. 3,793,236; 8,501,877; U.S. Pat. App. Pub. No. 2010/0151138A1); urethanes disclosed in (EP Pat. Nos. 226,176B1; EP 0,643,086A1 U.S. Pat. No. 9,334,379); and ureas disclosed in U.S. Pat. No. 6,617,032B2; and CN Pat. No. 103,568,337B). For instance, U.S. Pat. No. 4,564,651 teaches cured isocyanate/epoxy blends with an epoxy to isocyanate ratio less than 1:5 are extremely brittle and get increasingly worse with increasing concentration of diphenylmethane diisocyanate concentration (MDI) and U.S. Pat. No. 5,036,135 teaches that when less than 20% epoxy is included in the polyisocyanurate polymer, it exhibits poor mechanical properties. These two patents teach that it is not possible to obtain a polymer with high strength and toughness with less than 20% epoxy or less than 20% oxazolidone which is the result of the reaction between an isocyanate and an epoxy at high temperature. EP Pat. App. No. 3,189,088A1 further teaches that "polyisocyanurate comprising materials are known to be very difficult to toughen and some may be too brittle to toughen effectively" and "attempts to increase the fracture toughness in the past often came at the expense of changes (typically reduction) in modulus and of reductions in thermal properties e.g. glass transition temperature ($T_g$) thereby creating unacceptable limits on the applicability of the resulting composite."

US Pat. App. Pub. No. 2018/0051119 A1 teaches that the molar ratio of the at least one epoxy resin to the at least one isocyanate resin should be at least 0.4:1 and most preferably 1:1 and that this ratio leads to "particularly advantageous properties with the glass transition temperature, the modulus of elasticity and impact resistance." These preferred ratios far exceed catalytic amounts of epoxy to achieve desirable tensile strength, tensile stiffness and tensile strain to failure results. Furthermore, the aforementioned patents clearly teach that polymers and foams composed essentially of polyisocyanurates exhibit a high degree of brittleness.

U.S. Pat. No. 4,070,416 discloses processes for manufacturing oxazolidone/isocyanurate polymers with an epoxy to isocyanate ratio less than one and points out that high glass transition temperatures and good mechanical properties are obtained with the most advantageous epoxy to isocyanate ratio is in the range of 0.29 to 0.5. U.S. Pat. No. 4,070,416 discloses "since the isocyanurate bond part having a high cross-linking density and the comparatively flexible part based on the epoxide are present together, maintaining an adequate balance between two parts, a cured product with excellent mechanical properties could be obtained." The inventors state that "when the polyfunctional organic isocyanate is in the amount of 5 equivalents or more, there is a tendency of the properties of the cured product becoming remarkably brittle. Particularly, when the polyfunctional organic isocyanate is used within a range of 2 to 3.5 equivalents, a good result is obtained in the respects of thermal stability and mechanical performance." U.S. Pat. No. 4,564,651 discloses that the inventors have evaluated the results of the polymer U.S. Pat. No. 4,070,416 in the ranges specified for epoxy to isocyanate ratio and found "according to the cross-linking conditions given, extremely brittle oxazolidone/isocyanurate molded materials are obtained, and the mechanical properties of which get increasingly worse with increasing concentration of diphenylmethane diisocyanate" (MDI). The inventors assert 1 to 5 times epoxy to isocyanate should be mixed to obtain polymers of good mechanical properties. This disclosure refutes that a that a large fraction of oxazolidone is required to achieve a polymer with high strength, high strain to failure, high fracture toughness and high glass transition temperature demonstrating that a cured composition consisting essentially of isocyanurate crosslinks is capable of providing excellent mechanical properties when polymeric methylene diphenyl diisocyanate (pMDI) is included in the reaction mixture along with a catalytic amount of epoxy.

While oxazolidone has received significant application due to its high thermal stability, the formation of oxazolidone requires high temperature, typically greater than 150° C., and therefore are not compatible with all applications. Polyurethanes are a common chemistry in the development of Coatings, Adhesives, Sealants and Elastomers (CASE) as well as rigid plastics and is formed through the reaction of a hydroxyl with an isocyanate, with most polymers being formed from the reaction of diols or polyols with diisocyanates or polyisocyanates. When trimerization is desired, this chemistry is often used to form prepolymers or incorporated into the reaction mixture such that the weight percent of isocyanates (denoted NCO) in the reaction mixture decreases and the cured composition exhibits improved elasticity and toughness, however typically at the expense of Young's modulus and glass transition temperature (Tg). U.S. Pat. No. 9,816,008 B2 teaches that it is generally preferred to cure with one or more polyols present with the upper limit on the isocyanate to polyol ratio being 10:1 or in other words an isocyanate index of 10. U.S. Pat. No. 6,294,117 discloses the use of polymeric MDI along with a phenol novolac resin with a concentration ratio to pMDI of 2:1 to 10:1, and preferably a ratio from 3:1 to 7:1 to produce wood adhesives which do not require formaldehyde. U.S. Pat. No. 6,294,117 teaches that pMDI requires high percentages of phenol novolac resin to form a high strength polymer with high toughness. Each of these patents teach that urethane linkages are required to achieve a cured composition with acceptable mechanical properties.

Numerous patents focus on the formation of oligomer prepolymers with terminal isocyanate groups that can be can subsequently reacted with molecules containing active hydrogen to form a dense polymer. U.S. Pat. No. 4,382,125 describes the prepolymerization of an isocyanate blend of MDI isomers and polymeric MDI to form a partially trimerized isocyanurate polymer and its subsequent reaction with a polyol to reduce the friability of isocyanurate foams. U.S. Pat. No. 6,515,125 discloses a storage-stable, liquid, partially trimerized polyisocyanate having an NCO group content of 24 to 40% by weight containing 20 to 88% by weight of TDI and 12 to 80% by weight of MDI. U.S. Pat. No. 4,518,761 discloses a process for the preparation of mixed trimers by at least partially trimerizing the isocyanate groups of two isocyanate components with different reactivities (with respect to trimerization) in the presence of a trimerization catalyst, and mixed trimers prepared by this process. U.S. Pat. No. 4,456,709 describes storage-stable liquid polyisocyanates which have an NCO group content of 36.5 to 45% and are prepared by mixing 25 to 70 parts of partially trimerized 2,4-TDI with 75 to 30 parts of unmodified 2,4- and/or 2,6-TDI. While these references disclose numerous methods to produce isocyanurate prepolymers of aromatic, aliphatic and blended aromatic and aliphatic structure, none disclose a cured composition that is prepared through the reaction of essentially isocyanates An alternative approach to the preparation of a polyisocyanurate polymer which exhibits increased fracture toughness is the preparation of prepolymers which include amide, imide, urea, urethane, allophanate or biuret bonds and the subsequent trimerization of the isocyanate terminated prepolymer. U.S. Pat. Nos. 6,028,158 and 6,063,891 disclose allophanate-modified toluene diisocyanurates having an NCO group content of about 15 to about 42%. These compositions are prepared by reacting A) toluene diisocyanate, and B) an organic compound containing at least one hydroxyl group, in the presence of a catalytic amount of C) at least one allophanate-trimer catalyst, or an allophanate-trimer catalyst system. These compositions contain both isocyanurate groups and high percentages of allophanate groups as well as urethane groups. However these patents do not teach the subsequent reaction of the allophanate-modified toluene diisocyanurates with themselves or other isocyanate terminated monomers, oligomers or prepolymers or polymers to form a cured composition.

U.S. Pat. Nos. 4,359,550, 3,817,939 and 4,359,541 describes the formation of a trimerized prepolymer and subsequently reacting the residual free isocyanate with a monofunctional active hydrogen compound or mixtures thereof, thus producing an polyurethane containing the isocyanurate trimer. While there is a wealth of literature on the formation of isocyanurate containing prepolymers which are subsequently reacted with active hydrogen containing molecules or the trimerization of isocyanate terminated prepolymers prepared using urethane, urea, allophanate, amide, biuret or oxazolidone, each of the reaction mixtures require active hydrogen compounds to form cured composition thus utilizing urethane, amide, urea, biuret, or allophanate reaction products form the cured composition. The present invention discloses a cured composition which is produced from a reaction mixture consisting of essentially isocyanate terminated monomers, oligomers or prepolymers or polymers to form a cured composition.

EP Pat. No. 226,176 B1 describes a composite material based on polyisocyanurates and containing reinforcing fillers, in which the polyisocyanurate matrix is derived from a isocyanurate repeating structural unit having the formula

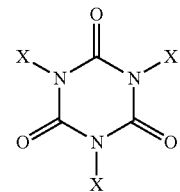

where at least one group X represents the group —R$_1$—NCO and at least one group X represents the group —R$_1$—NH—CO—OR$_2$—(—OCO—NH—R$_1$—NCO)$_n$, in which n is an integer of from 1 to 8, preferably of from 1 to 3, R$_1$ is an aliphatic, cycloaliphatic, aromatic or mixed group containing up to 20 carbon atoms and R$_2$, the same as or different from R$_1$, is an aliphatic, cycloaliphatic, aromatic or mixed group containing up to 20 carbon atoms or, also, a carbonic, siloxane, silane or corresponding mixed group; which composite material is obtainable by the process specified below. According to a preferred embodiment, in the repeating structural unit of formula (I), on the average two groups X represent the group —R$_1$NCO and the third group X represents the radical —R$_1$—NH—CO—OR$_2$—(—OCO—NH—R$_1$—NCO)$_n$. The prepolymer formed therefore is a polyurethane prepolymer where a minimum of 33% of the linkages are polyurethane chains. The inventors also state "An essential feature of the present composite materials is the process by which they are obtainable, including the use of particular prepolymers, prepared by partial addition of polyisocyanates and polyols which remain fluid at room temperature" therefore clearly describing an isocyanurate modified polyurethane. EP Patent No. 226,176 B1 does not teach a cured composition or a cured composition containing reinforcing fillers that is essentially composed of isocyanurates.

U.S. Pat. No. 9,334,379 relates to fiber-composite components that are produced by impregnating fibers with a reaction resin mixture of polyisocyanates, polyols, trimerization catalysts and optionally additives, and to a method for production thereof. The inventors teach the ratio of number of isocyanate groups to number of OH groups is from 1.6 to 6.0 and particularly from 2.1 to 3.5. U.S. Pat. No. 9,334,379 also discloses it is preferable that the reaction mixture comprises no epoxy resins and does not teach a polymer which is substantially composed of the reaction product of isocyanates with themselves, i.e. isocyanurates, uretdione, carbodiimides and the open structure.

U.S. Pat. App. Pub. No. US2005/0038222A1 discloses that thermosetting reins based on polyisocyanate and urethane chemistry have not been widely used in filament winding since it is mixing activated components and requires the accurate combination of two or more chemical precursors, such as a polyisocyanate and a polyol, at a well-defined stoichiometry. The problem with mixing activated components is the difficulty in controlling the reaction since the reaction can occur on contact, even at ambient temperature without a catalyst making the reaction rate difficult to control.

While the prior art references described above disclose various efforts to improve physical properties of polymers containing polyisocyanurates by reacting various active hydrogen containing molecules, none provide a cured composition which is produced through reactions that are essentially free of the reaction product of these moieties and provides the high strength, high stiffness, high strain to failure, high toughness and high glass transition temperature required by modern polymers, fiber reinforced polymers and adhesives.

SUMMARY

A method of making an isocyanurate polymer provides, in one embodiment, a liquid aromatic polyisocyanurate mixed with less than about 10% by weight epoxy resin into said liquid polyisocyanurate. In another embodiment, the liquid aromatic polyisocyanurate is mixed with a catalyst composition after providing epoxide resin at less than about 10% by weight. The aromatic polyisocyanurate includes polymeric methylene diphenyl diisocyanate (pMDI) providing the aromatic polyisocyanurate with an average functionality of greater than 2 for forming a reaction mixture. In one embodiment, the pMDI is includes a blend of MDI and higher functionality pMDI. The mixture is cured at a temperature of greater than about 70° C. to produce a polymer composition including the reaction product of two or more isocyanates. In another embodiment the mixture is aged at ambient temperature and pressure for providing enhanced performance results.

Prior art literature indicates reaction mixtures using high percentages of pMDI or other aromatic polyisocyanurates results in poor performing polymers that are typically too brittle for any practical use. The chemical composition of the present invention disproves these assertions and yields unexpected performance results that exceed all other polyisocyanurate mixtures. Significantly, the glass transition temperature of the resultant thermoset polymer is well above 300° C., a level previously unachievable of a polyisocyanurate.

Remarkably, it is found that aging of the polymer in an atmospheric pressure and temperature environment containing moisture yields an isocyanurate polymer which greatly increases its glass transition temperature (Tg). Furthermore, it is shown that the presence of an aliphatic isocyanurate (trimer) or uretdione (dimer) in the reaction mixture yields a more complete cure and reduces the temperature required to achieve a high strength polymer. The Invention has also found that the polymer can be cured in under 5 minutes resulting in mechanical properties equivalent to polymers cured for longer times and at great temperatures.

BRIEF DESCRIPTION OF THE DRAWINGS

Other advantages of the present invention will be readily appreciated as the same becomes better understood by reference to the following detailed description when considered in connection with the accompanied drawings, wherein.

DETAILED DESCRIPTION

Figure 1:
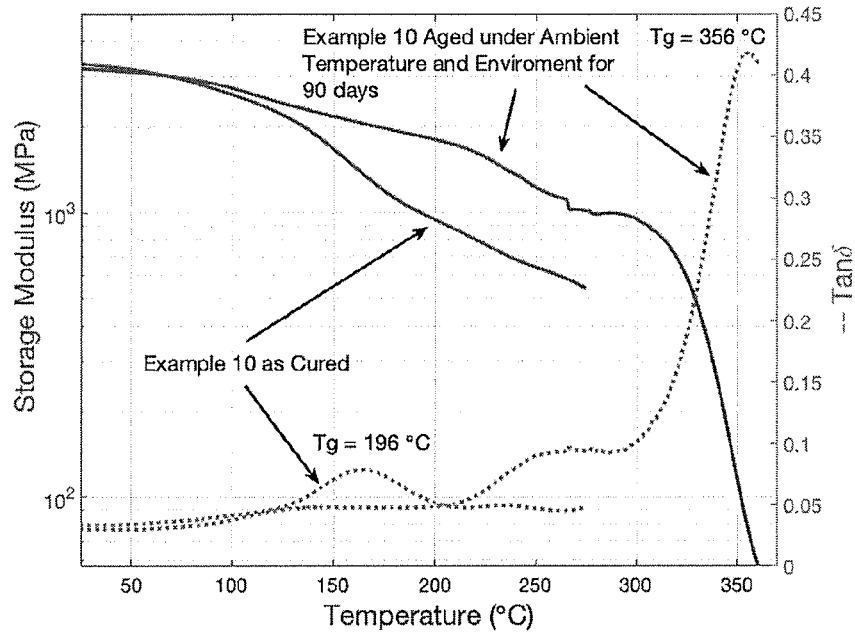
FIG. 1: DMA measurements for Example 10 following thermal curing and after allowing the sample to sit at ambient temperature, pressure and humidity for 90 days.

The present invention has found that the polymerization of a liquid reaction mixture that includes polymeric methylene diphenyl diisocyanate (pMDI) results in a cured composition with high strength, glass transition, Young's modulus and toughness while the reaction mixture is substantially free of chemistries that would result in chain extenders such as oxazolidones, amides, urethanes and ureas during the curing. As will be explained further herein below, selecting an appropriate catalyst further enables the cured composition of the present invention to be obtained in under 5 minutes at 120° C. and in under 2.5 minutes at above 140° C., providing results not previously achievable. In the present invention a dense polymer is one that is substantially free of voids with a void content less than 10% and even less than 2%. The present invention achieves a high toughness (greater than 0.5 MPa·m$^{1/2}$), high strain to failure (greater than 3%), high glass transition temperature (greater than 160° C.), high tensile strength (greater than 60 MPa) through the polymerization of a reaction mixture of containing polymeric methylene diphenyl diisocyanate and a catalytic amount of epoxy while being substantially free of molecules containing active hydrogen moieties such as hydroxyls, primary and secondary amines, carboxylic acids, thiols, and others known to one of skill in the art. The present invention further demonstrates that contrary to expectations, the presence of aliphatic uretdione, aliphatic trimer, or aliphatic iminooxadiazinedione which are reaction products of two or three aliphatic isocyanates accelerates the polymerization reaction enabling greater isocyanate conversion and improved mechanical strength at lower cure temperature.

The present invention provides a method for producing a cured polymer composition through the polymerization of isocyanate groups, in one embodiment, the method comprising the following steps:

(1) providing a liquid reaction mixture, including:
A) at least one liquid, aromatic polyisocyanate; and
B) optionally at least one liquid, aliphatic polyisocyanate
C) a catalyst composition,
in which the at least one aromatic polyisocyanate includes polymeric methylene diphenyl diisocyanate (pMDI) such that the at least one aromatic polyisocyanate has a functionality greater than 2, in particular at least 2.2, or at least 2.5 and even greater than 2.65. Further, the reaction composition includes at least one epoxide, which may be monofunctional or polyfunctional in a proportion to the total reaction mixture of up to 7.5% by weight, in particular between 0.01%-5%, in another embodiment between 0.5%-4% and in another embodiment between 1.0%-3% and in a further embodiment 2%.

(2) curing the reaction mixture through the self-reaction of the isocyanate groups so as to obtain a cured polymer composition comprising a structure of the reaction product of isocyanates with themselves.

In a further aspect, the present invention relates to a cured composition which contains fillers to improve the mechanical properties of the cured composition where the fillers are in one embodiment continuous fibers or in another embodiment discontinuous fibers.

"At least one," as used herein, refers to 1 or more, for example 1, 2, 3, 4, 5, 6, 7, 8, 9, or more. In connection with components of the catalyst compositions described herein, this information does not refer to the absolute amount of molecules, but to the type of the component. "At least one epoxy resin" therefore signifies, for example, one or more different epoxy resins, which is to say one or more different types of epoxy resins. Together with quantities, the quantities refer to the total amount of the correspondingly identified type of component, as already defined.

"Liquid," as used herein, denotes compositions that are flowable at room temperature (20° C.) and normal pressure (1,013 mbar).

When referring to a chemical moiety, "Substantially Free" means a molar fraction of molecules containing that particular moiety of less than 7.5% in the reaction mixture or cured composition. In some cases "Substantially Free" means the molar fraction of molecules containing that particular moiety of less than 5% in the reaction mixture or cured composition. Conversely, "Substantially" and "Essentially" means a molar fraction of molecules containing that particular moiety of more than 92.5% of the reaction mixture or cured composition. In some cases the "Substantially" and "Essentially" means the molar fraction of molecules containing that particular moiety is greater than 95% of the reaction mixture or cured composition.

The viscosity of the liquid composition described herein is in particular low enough for the composition to be pumpable and capable of wetting and impregnating fiber materials, for example, such as are used for fiber-reinforced plastic parts. In various embodiments, the reaction mixture has a viscosity of <2,500 mPa·s at room temperature and <150 mPa·s at a temperature of 50° C. So as to determine the viscosity, the resin mixture is produced at room temperature using a suitable mixer, and the viscosity is determined on a spindle type rheometer.

The invention provides a cured composition with high strength, high fracture toughness and high glass transition temperature through curing a reaction mixture composed essentially of polyisocyanates where at least one of the polyisocyanate is polymeric methylene diphenyl diisocyanate (pMDI) such that the reaction mixture has a functionality greater than 2, in particular at least 2.2, and in another embodiment at least 2.5 and in still a further embodiment greater than 2.7. Upon curing the reaction mixture using a trimerization catalyst that includes at least one epoxy, a rigid polymer is obtained and this essentially isocyanurate polymer exhibits high tensile strength (greater than 50 MPa), high toughness (greater than 0.5 MPa·m$^{1/2}$), high strain to failure (greater than 3%), and high glass transition temperature (greater than 160° C.). The preparation of the essentially polyisocyanurate cured composition lacks fracture toughness and strength without the use of polymeric methylene diphenyl diisocyanate (pMDI) as a fraction of the reaction mixture so as to produce an isocyanate functionality greater than 2, in particular at least 2.2, more preferably at least 2.5 and still more preferably greater than 2.65. Although epoxy is known in the prior art to improve the fracture toughness of polymers, the present invention includes epoxy in an amount representative of being a catalyst and therefore does not significantly affect material properties.

Oligomeric MDI in the sense of this application means a polyisocyanate mixture of higher-nuclear homologues of MDI, which have at least 3 aromatic nuclei and a functionality of at least 3. The term "polymeric diphenylmethane diisocyanate", "polymeric MDI", "Oligomer MDI" or pMDI is used in the context of the present invention to refer to a mixture of oligomeric MDI and optionally monomeric MDI. Typically, the monomer content of the polymeric MDI is in the range from 25 to 85 wt. %, based on the total mass of the pMDI such that the average functionality is greater than about 2.1.

In addition to pMDI, the isocyanate mixture in step 1) may contain monomeric or oligomeric isocyanates or prepolymer isocyanates. Monomeric isocyanates include the customary aliphatic, cycloaliphatic, and aliphatic di- and/or polyisocyanates and especially aromatic isocyanates which are known from polyurethane chemistry. Aromatic isocyanates, especially the isomers of the MDI series (monomeric MDI) and TDI are particularly beneficial.

Isocyanates useful in embodiments disclosed herein may include isocyanates, polyisocyanates, isocyanate carbodiimides, uretdiones and trimers composed of such isocyanates. Suitable polyisocyanates include any of the known aromatic, aliphatic, alicyclic, cycloaliphatic, and aralphatic di- and/or polyisocyanates. Inclusive of these isocyanates are variants such as uretdiones, isocyanurates, carbodiimides, iminooxadiazinedione, among others which are produced through the reaction between isocyanates.

Suitable aromatic diisocyanate compounds may include for example xylylene diisocyanate, metaxylylene diisocyanate, tetramethylxylylene diisocyanate, tolylene diisocyanate, 4,4'-diphenylmethane diisocyanate, 1,5-naphthalene diisocyanate, 1,4-naphthalene diisocyanate, 4,4'-toluidine diisocyanate, 4,4'-diphenyl ether diisocyanate, m- or p-phenylene diisocyanate, 4,4'-biphenylene diisocyanate, 3,3'-dimethyl-4,4'-biphenylene diisocyanate, bis(4-isocyanatophenyl)-sulfone, isopropylidenebis(4-phenylisocyanate), and the like. Polyisocyanates having three or more isocyanate groups per molecule may include, for example, triphenylmethane-4,4',4"-triisocyanate, 1,3,5-triisocyanato-benzene, 2,4,6-triisocyanatotoluene, 4,4'-dimethyldiphenylmethane-2,2',5,5'-tetraisocyanate, and the like. Aliphatic polyisocyanates may include hexamethylene diisocyanate, 1,4-Diisocyanatobutane, 1,8-Diisocyanatooctane, m-xylene diisocyanate, p-xylene diisocyanate trimethylhexamethylene diisocyanate, dimeric acid diisocyanate, lysine diisocyanate and the like, and the uretdione-type adducts, carbodiimide adducts and isocyanurate ring adducts of these polyisocyanates. Alicyclic diisocyanates may include isophorone diisocyanate, 4,4'-methylenebis(cyclohexylisocyanate), methylcyclohexane-2,4- or -2,6-diisocyanate, 1,3- or 1,4-di(isocyanatomethyl)cyclohexane, 1,4-cyclohexane diisocyanate, 1,3-cyclopentane diisocyanate, 1,2-cyclohexane diisocyanate, and the like, and the uretdione-type adducts, carbodiimide adducts and isocyanurate ring adducts of these polyisocyanates.

In further embodiments of this invention, the reaction mixture comprises 15-85% polymeric MDI, 15-85% Diphenylmethane Diisocyanate isomers and homologues. In other embodiments of this invention the reaction mixture, comprises 15-85% polymeric MDI, 25-65% Diphenylmethane Diisocyanate isomers and homologues and 2-20% the uretdione of hexamethylene diisocyanate. In another, embodiment of this invention the reaction mixture, comprises 15-85% polymeric MDI, 25-65% Diphenylmethane Diisocyanate isomers and homologues and 2-20% the trimer of hexamethylene diisocyanate.

Surprisingly, the cured composition formed in step 2) of this invention achieves a greater isocyanate conversion when the reaction mixture contains aliphatic uretdione, aliphatic isocyanurate, or aliphatic iminooxadiazinedione, enabling the cured composition to obtain high mechanical properties at lower reaction temperature than in their absence. This result is unexpected since aliphatic isocyanates are known to react more slowly than aromatic isocyanates however in the reaction mixture of step 1) the reactivity is enhanced. Uretdiones, isocyanurates, carbodiimides and iminooxadiazinediones are the reaction product of 2 or 3 isocyanates as shown below where x, x' and x" may be the same or different aliphatic linages with a terminal isocyanate group.

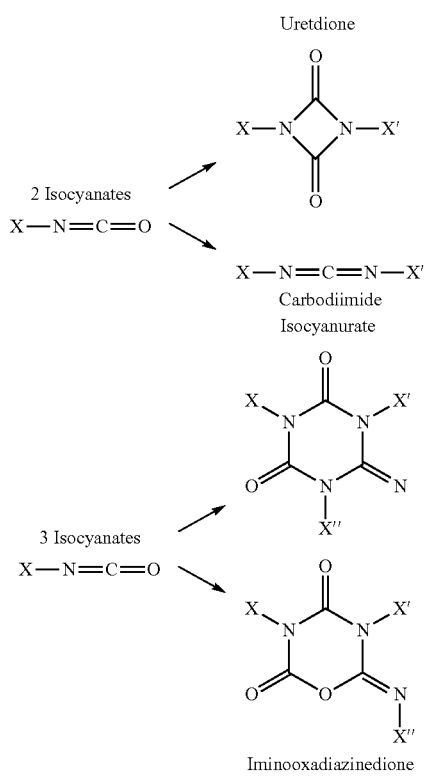

Mixtures of any of the above-listed isocyanates may, of course, also be used. Furthermore, there are many different orders of contacting or combining the compounds required to make the polyisocyanurate comprising reaction mixture of the present invention. One of skill in the art would realize that blending or varying the order of addition of the compounds falls within the scope of the present invention.

Catalyst Composition

The reaction mixture is cured via a catalyst composition which induces trimerization of the polymer. Trimerization catalysts may include amine catalysts such as N,N-Dimethylbenzylamine (BDMA), 4-Dimethylaminopyridine (DMAP), 2-Dimethylaminopyridine (2-DMAP), 1,4-diazabicyclo[2.2.2]octane (DABCO), Bis-(2-dimethylaminoethyl)ether (BDMAEE), 1,8-Diazabicyclo[5.4.0]undec-7-ene (DBU), 1,5-Diazabicyclo[4.3.0]non-5-ene (DBN), N-alkylmorphalines, N-alkylalkanolamines, Tris(Dimethylaminopropyl) Hexahydrotriazine, N,N-dialkylcyclohexylamines, and alkylamines where the alkyl groups are methyl, ethyl, propyl, butyl and isomeric forms thereof, and heterocyclic amines. Amine catalysts also include quaternary ammonium hydroxides and quaternary ammonium salts such as benzyl trimethyl ammonium hydroxide, benzyl trimethyl ammonium chloride, benzyl trimethyl ammonium methoxide (2-hydroxypropyl)trimethylammonium 2-ethylhexanoate, (2-hydroxypropyl)trimethylammonium formate and the like. In one embodiment, BDMA and in another embodiment BDMAEE and in another embodiment DABCO dissolved in a suitable solvent such as benzene, benzonitrile, tetrahydrofuran, nitrobenzene, or other suitable solvents as known to one skilled in the art, are used in the catalyst composition at weights between 0.001 and 10 wt. % and more preferably between 0.1 and 3 wt. %. In another embodiment, a catalyst may be used as the solvent for DABCO, suitable catalyst solvents include BDMA, imidazoles, organometallic compounds or other catalysts that may solvate DABCO as known to one skilled in the art, are used in the catalyst composition at weights between 0.001 and 10 wt. % and more preferably between 0.1 and 3 wt. %.

Non-amine catalysts may also be used. Organometallic compounds of bismuth, lead, tin, potassium, lithium, sodium, titanium, iron, antimony, uranium, cadmium, cobalt, thorium, aluminum, mercury, zinc, nickel, cerium, molybdenum, vanadium, copper, manganese, and zirconium, may be used. Illustrative examples include potassium acetate, potassium naphtholate, potassium octoate, potassium 2-ethylhexanoate, bismuth nitrate, lead 2-ethylhexoate, lead benzoate, ferric chloride, antimony trichloride, stannous acetate, stannous octoate, and stannous 2-ethylhexoate.

In other embodiments, suitable catalysts may include imidazole compounds including compounds having one imidazole ring per molecule, such as imidazole, 2-methylimidazole, 2-ethyl-4-methylimidazole, 2-undecylimidazole, 2-heptadecylimidazole, 2-phenylimidazole, 2-phenyl-4-methylimidazole, 1-benzyl-2-methylimidazole, 2-ethylimidazole, 2-isopropylimidazole, 2-phenyl-4-benzylimidazole, 1-cyanoethyl-2-methylimidazole, 1-cyanoethyl-2-ethyl-4-methylimidazole, 1-cyanoethyl-2-undecylimidazole, 1-cyanoethyl-2-isopropylimidazole, 1-cyanoethyl-2-phenylimidazole, 2,4-diamino-6-[2'-methylimidazolyl-(1)']-ethyl-s-triazine, 2,4-diamino-6-[2'-ethyl-4-methyl imidazolyl-(1)']-ethyl-s-triazine, 2,4-diamino-6-[2'-undecylimidazolyl-(1)']-ethyl-s-triazine, 2-methylimidazolium-isocyanuric acid adduct, 2-phenylimidazolium-isocyanuric acid adduct, 1-aminoethyl-2-methylimidazole, 2-phenyl-4,5-dihydroxymethylimidazole, 2-phenyl-4-methyl-5-hydroxymethylimidazole, 2-phenyl-4-benzyl-5-hydroxymethylimidazole and the like; and compounds containing 2 or more imidazole rings per molecule which are obtained by dehydrating above-named hydroxymethyl-containing imidazole compounds such as 2-phenyl-4,5-dihydroxymethylimidazole, 2-phenyl-4-methyl-5-hydroxymethylimidazole and 2-phenyl-4-benzyl-5-hydroxymethylimidazole; and condensing them by deformaldehyde reaction, e.g., 4,4'-methylene-bis-(2-ethyl-5-methylimidazole), and the like.

Optionally, a latent catalyst, such as those described in U.S. Pat. No. 9,334,379, can be used to delay the curing reaction. Such latent catalysts are known to one skilled art and are commonly used in the preparation of prepreg, sheet molding compound (SMC) and bulk molding compound (BMC). In one embodiment not disclosed in the prior art, 2-(Dimethylamino)pyridine acts as a latent catalyst.

In other embodiments of this invention, the catalyst includes a co-catalyst of at least one epoxy resin. The co-catalyst behavior of epoxy resin has been reported in U.S. Pat. No. 2,979,485. The epoxy resin may include epoxide group-containing monomers, prepolymers and polymers and mixtures thereof, and is hereafter also referred to as an epoxide or epoxide group-containing resin. Suitable epoxide group-containing resins are in particular resins including 1 to 10, and alternatively 1 to 2, and alternatively 1 epoxide groups per molecule. "Epoxide groups," as used herein, refers to 1,2-epoxide groups (oxiranes). Preferably, at least one epoxide is added to the reaction mixture at weights between 0.1 and 10 wt. % and alternatively between 0.5 and 3 wt. % of the reaction mixture. The epoxy acts as a co-catalyst, however may be added to the reaction mixture separate from the trimerization catalyst. In one embodiment, the epoxy is mixed with the essentially isocyanurate reaction mixture forming a storage stable mixture that can be catalyzed at a future time.

The reaction mixture is mixed with the catalyst composition and cured through trimerization to form a cured composition essentially composed of polyisocyanurates and having a density of ≥500 and, preferably ≥1000 kg/m$^3$. The curing reaction is preferentially carried out at elevated temperature between 50-200° C., or alternatively between 75-170° C., or further between 80-150° C. In one embodiment of the invention, the reaction mixture is mixed with the catalyst composition and cured to form a cured composition essentially composed of the reaction product between two or more isocyanates which includes imides.

The trimerization of isocyanurates is known to be a slow process especially in the absence of a solvent, however, the present invention can cure surprisingly fast. The present invention has shown that reaction mixture can cure in under 5 minutes at 120° C. or under 2.5 minutes at temperatures greater than 140° C. while achieving mechanical properties (see Examples 17-23) comparable to those cured for longer durations (see Example 11). Rapidly curing polymers are needed for the manufacture of high volume industries, such as the automotive industry where polymerization in under 10 minutes is necessary. The unexpectedly rapid cure further achieves high strength, stiffness and toughness. In one embodiment of the present invention the reaction mixture can cure in under 2 minutes and in another the reaction mixture can cure in 90 seconds or less. In another embodiment of the present invention the reaction mixture can cure in under 60 seconds. The speed of the reaction is controlled by the catalyst concentration and is greatly accelerated by the presence of an epoxy or epoxide included as a co-catalyst which reacts with the trimerization catalyst to form a complex. With increasing ratio of epoxy to trimerization catalyst the rate of polymerization increases. Surprisingly it has been found that the reactive mixture according to the present invention remains stable for a considerable period of time until the temperature is increased to 70° C. or higher after which curing happens very quickly. Furthermore, the reaction exhibits a low exotherm compared to other fast curing resins (fir instance: vinyl esters, epoxies, polyesters, etc.) therefore allowing the processing of thick materials.

Figure 2:
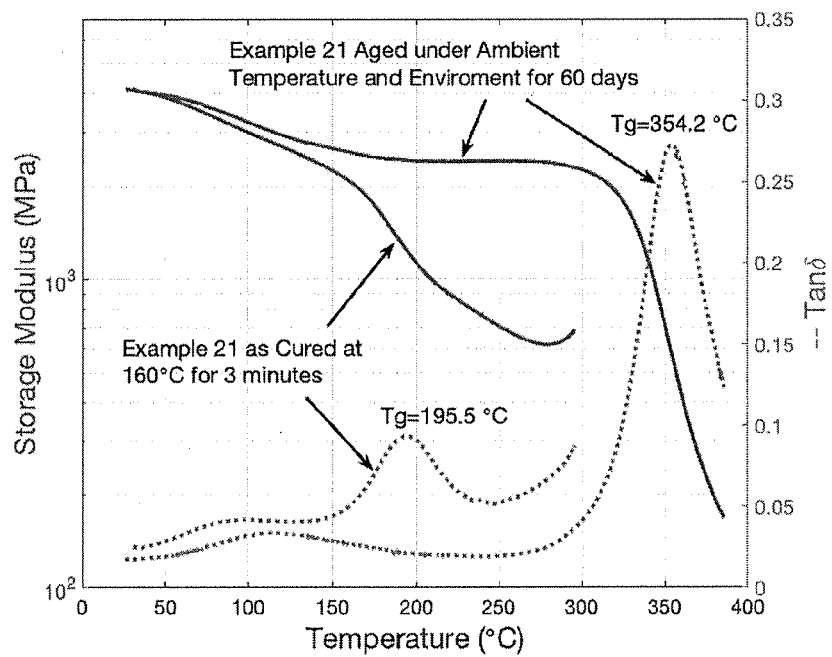
FIG. 2 shows DMA measurements for Example 21 following aging at ambient temperature and humidity in a climate controlled laboratory for 60 days.
Figure 3:
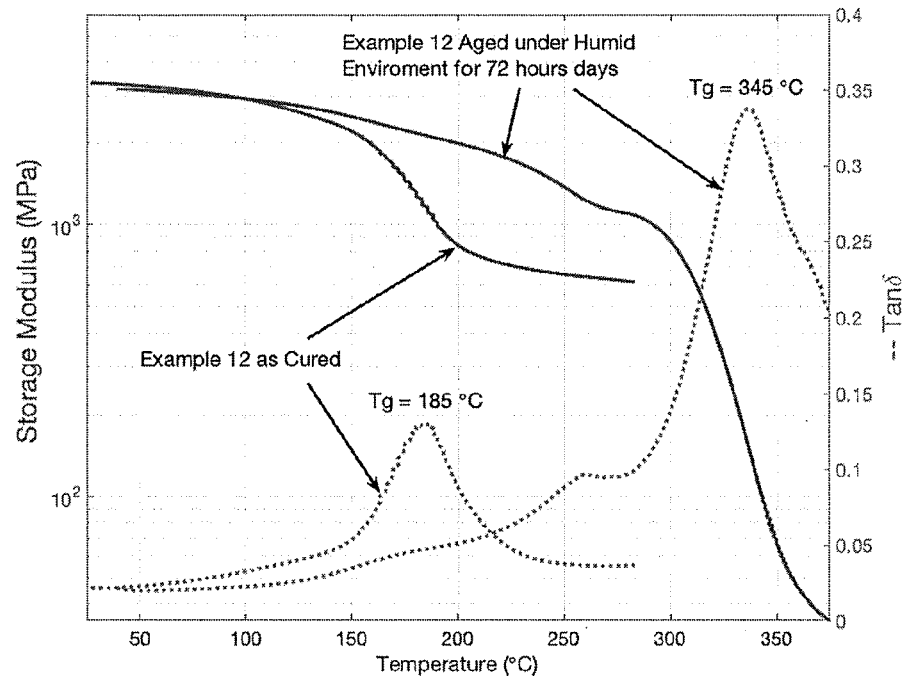
FIG. 3: DMA measurements for Example 12 following thermal curing and after subjecting the cured sample to an environment with 100% humidity at 40° C. for 72 hours.

Unexpectedly, the cured composition continues to cure over time, and optionally in the presence of humidity or moisture around the sample, enabling it to obtain a glass transition temperature greater than 250° C., or greater than 300° C. or greater than 325° C. or greater than 340° C. The rate of this final curing reaction is dictated by the temperature and humidity of the environment around the cured composition. When the cured composition is subjected to the typical levels of humidity in a climate controlled building, for example, a relative humidity of 20 to 70% at 22° C., the final reaction will complete in 2 to 12 weeks, or alternatively 4 to 8 weeks. FIG. 1 shows the storage modulus and tan δ measured through dynamic mechanical analysis (DMA) for Example 10 following 90 days aging demonstrating a greatly improved glass transition temperature. FIG. 2 shows the storage modulus and tan δ measured through dynamic mechanical analysis (DMA) for Example 21 following 60 days aging in an ambient environment demonstrating a greatly improved glass transition temperature increasing from 195.5° C. after curing to 354.2° C. after sitting at ambient atmospheric conditions for 60 days. FIG. 2 demonstrates that samples cured in under 5 minutes exhibit the same unexpected increase in Tg as those cured for longer times. However, as shown in the DMA measurements of FIG. 3, a relative humidity of 100% at 40° C. and atmospheric pressure will complete the reaction in 24 to 72 hours or alternatively 24 hours. The aging reaction conditions are variable with greater levels of humidity and temperature enabling more rapid cure. Referring to FIG. 1, DMA measurements for Example 10, as explained further herein below, following thermal curing and after allowing the sample to sit at ambient temperature, pressure and humidity for 90 days. The glass transition temperature (Tg) increases from 196° C. to 356° C. following the aging period. This result is completely unexpected based upon the teachings of the prior art. Furthermore, referring to FIG. 3, the DMA measurements for Example 12, as is explained further herein below, following thermal curing and after subjecting the cured sample to an environment with 100% humidity at 40° C. for 72 hours. The glass transition temperature (Tg) increases from 185° C. to 345° C., another unexpected result.

Figure 4:
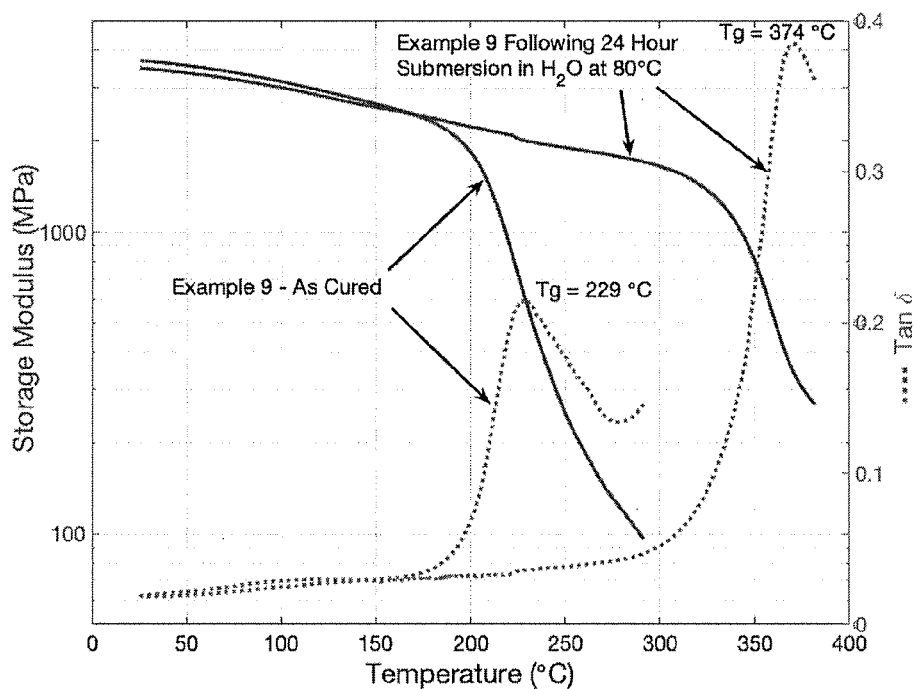
FIG. 4: DMA measurements for Example 9 following thermal curing and after submerging the cured sample in water at atmospheric pressure at 80° C. for 24 hours.

In an additional embodiment, the cured composition may be submerged in water to complete the reaction to obtain a glass transition temperature greater than 250° C., or greater than 300° C. or greater than 325° C. or greater than 340° C. The rate of reaction is believed to be determined by the temperature and pressure of the water. For example, submerging the sample in 80° C. will lead to a full cure in under 48 hours or under 24 hours. The thermo-mechanical properties as measured by a dynamic mechanical analyzer (DMA) are shown in FIG. 4 for Example 9 following thermal curing and after submersion of the thermally cured polymer in atmospheric pressure water at 80° C. for 24 hours. The glass transition temperature (Tg) is measured from the peak of the Tan δ curve and shows the Tg increases from 240° C. to 374° C. following submersion in water. Most polymers experience a decrease in glass transition temperature following moisture absorption, however the current invention shows a drastic improvement in glass transition temperature. Referring to FIG. 4, DMA measurements for Example 9, as will be explained further herein below, following thermal curing and after submerging the cured sample in water at atmospheric pressure at 80° C. for 24 hours. The glass transition temperature (Tg) increases from 240° C. to 374° C. following submersion in water.

In one embodiment of the invention, the reaction mixture is blended with reinforcing fibers, either continuous or discontinuous and cured using the trimerization catalyst composition to form a fiber-reinforced molded part. Such molded parts are useful in the construction of automobiles, wind turbines, sporting goods, aerospace structures, pressure vessels, building materials, and printed circuit boards. However, the end use of the fiber-reinforced plastic molded part may be applied to other applications as would be known to one of ordinary skill in the art.

Known high-strength fiber materials suitable as fiber components for the fiber reinforced cured composition include for example carbon fibers, glass fibers; synthetic fibers, such as polyester fibers, polyethylene fibers, polypropylene fibers, polyamide fibers, polyimide fibers, polyoxazole fibers, polyhydroquinone-diimidazopyridine fibers or aramid fibers; boron fibers; oxidic or non-oxidic ceramic fibers such as aluminum oxide/silicon dioxide fibers, silicon carbide fibers; metal fibers, for example made of steel or aluminum; or natural fibers, such as flax, hemp or jute. These fibers can be introduced in the form of mats, woven fabrics, knitted fabrics, laid scrims, non-woven fabrics or rovings. It is also possible to use two or more of these fiber materials in the form of a mixture. Such high-strength fibers, laid scrims, woven fabrics and rovings are known to a person of ordinary skill in the art.

In particular, the fiber composite is to comprise fibers in percent by volume of more than 25 vol. %, alternatively more than 50 vol. %, and alternatively between 50 and 70 vol. %, based on the total fiber composite, so as to achieve particularly good mechanical properties.

The reaction mixture may be blended with reinforcing fibers through known methods, for example resin transfer molding (RTM), vacuum assisted resin transfer molding (VARTM), injection molding, high pressure reaction injection molding (HP-RIM), wet layup, pultrusion, or prepreg technology. The invention is particularly well suited for infusion due to it being a room temperature liquid.

In various embodiments of the invention, depending on the desired use, the reaction mixture is applied to a substrate, for example when used as an adhesive, or loaded into a molding tool, when used as a molding compound for producing plastic parts. In one embodiment, the method is a resin transfer molding (RTM) method, and the reaction mixture is a reactive injection resin. "Reactive," as used in the present context, refers to the fact that the injection resin can be chemically crosslinked. In the RTM method, providing the reaction mixture, which is to say step (1) of the described method, can include loading, and in particular injecting, the injection resin into a molding tool. When fiber-reinforced plastic parts are being produced, for which the described methods and reaction mixtures are particularly suitable, fibers or semi-finished fiber products (prewovens/preforms) can be placed in the molding tool prior to injection. The fibers and/or semi-finished fiber products used can be the materials known for this application in the prior art, and in particular carbon fibers.

In one embodiment of the invention, the reaction mixture is injected into a mold containing continuous or discontinuous fibers through resin transfer molding and cured in under 5 minutes. In another embodiment of the reaction mixture is injected into a mold containing continuous or discontinuous fibers through resin transfer molding and cured in under 2 minutes. In another embodiment of the invention, the reaction mixture is injected into a mold containing continuous or discontinuous fibers through resin transfer molding and cured in under 1 minute.

In one embodiment of the invention, the reaction mixture is injected into wind turbine blade mold containing continuous or discontinuous fibers through resin transfer molding and cured at a temperature below 95° C. In another embodiment of the present invention the reaction mixture is applied to continuous fibers through direct injection, or put into a resin bath and pultruded through a heated die. The catalyst is blended into the reaction mixture just prior to processing in either of these embodiments. It should also be understood that the inventive composition is particular well suited for pultrusion due to its fast cure which can be under 5 minutes or in another embodiment under 2 minutes.

Figure 5:
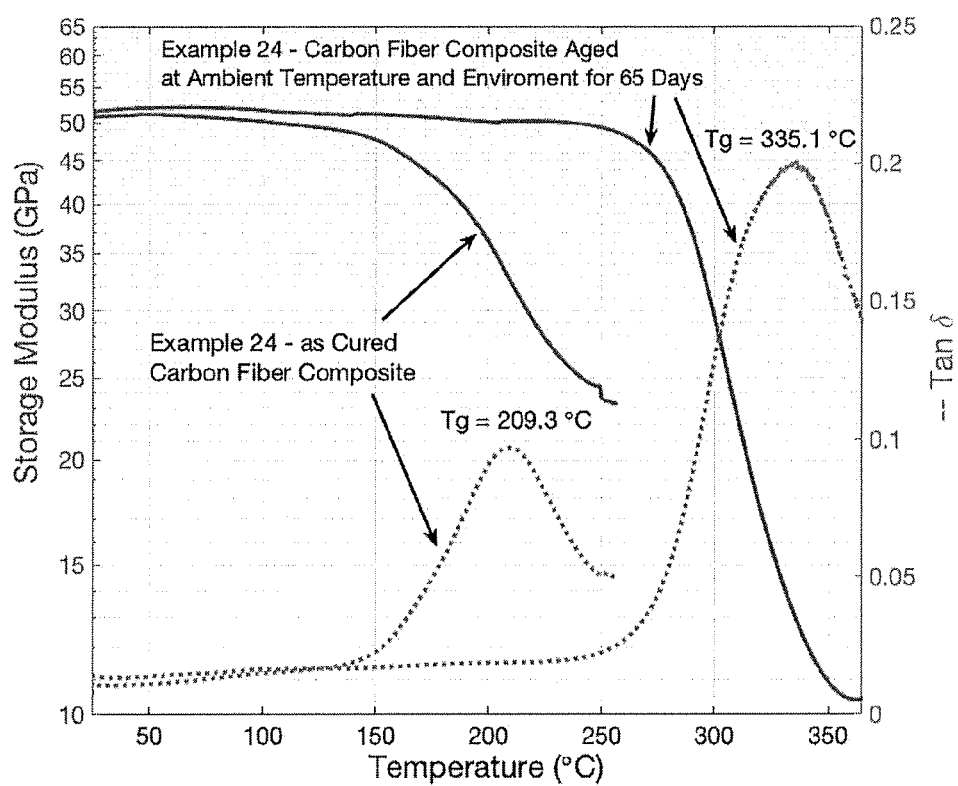
FIG. 5 shows DMA measurements for Example 24 of a carbon fiber composite following aging at ambient temperature and humidity in a climate controlled laboratory for 65 days.

Like the cured composition, a fiber reinforced composite prepared with the cured composition also exhibits an increased Tg with ambient aging. FIG. 5 shows the storage modulus and tan δ measured through dynamic mechanical analysis (DMA) for Example 24 following 65 days aging demonstrating a greatly improved glass transition temperature increasing from 209.3° C. to 335.1° C., a level not previously thought achievable.

In one embodiment of the invention, the reaction mixture includes sufficient adherent properties to be used as an adhesive. The reaction mixture may be blended with fillers known for adhesives, for instance, fumed silica; glass beads; ceramic particles; nanowires; nanorods; nanoparticles; carbon nanotubes (CNTs); synthetic particles such as rubbers, elastomers or thermoplastics;

In a still further embodiment of the invention, the cured composition is flame retardant. In another embodiment of the invention, the cured composition is non-flammable.

This invention achieves a cured composition composed essentially of isocyanurate crosslinks with excellent mechanical properties without a high curing temperature or costly chemical compounds. The present invention further obtains polymers with an incredibly high glass transition temperature. Furthermore, the present invention demonstrates that the presence of aliphatic uretdione, aliphatic trimer, or aliphatic iminooxadiazinedione in the reaction mixture accelerates the trimerization reaction leading to greater isocyanate conversion whereas common expectations would indicate the presence of an aliphatic component would reduce reactivity. This invention further shows that the polymerization reaction can reach completion in minutes making the polymer compatible with mass production.

EXAMPLES

Polyisocyanurate polymers were prepared through the following methods. Monomer MDI was used as a liquid blend of methylene diphenyl diisocyanate (MDI) isomers under the trade name MONDOUR MLQ from Covestro and LUPRANATE MI from BASF where the blend comprises essentially a 50/50 blend of 4,4'-MDI and 2,4'-MDI. A polymeric methylene diphenyl diisocyanate (pMDI) under the trade name LUPRANATE M20 from BASF which according to the material MSDS consists of <55% oligomeric MDI and 38% monomeric 4-4 Diphenylmethane Diisocyanate and <10% MDI isomers and an average isocyanate functionality of 2.7. Polymeric methylene diphenyl diisocyanate (pMDI) under the trade name MONDUR MR Light was acquired from Covestro, which according to the material MSDS consists of 58% oligomeric MDI and 38% monomeric 4-4 Diphenylmethane Diisocyanate and 3.8% 2,4'-MDI and 0.2% 2,2'-MDI and an average isocyanate functionality of 2.8. HDI uretdione was obtained from Covestro under the trade name DESMODUR N3400 and HDI Trimer was obtained from Wanhua under the trade name Wannate HT-100. Technical Grade Toluene Diisocyanate (80% Tolylene-2,4-diisocyanate) was acquired from Sigma Aldrich with a purity of 80%, All chemicals were used as received. An undiluted difunctional bisphenol A/epichlorohydrin derived liquid epoxy resin sold by Hexion under the trade name EPON™ 828 and A Diglycidyl Ether of Bisphenol F from Hexion as the trade name EPON™ 862 as well as monofunctional reactive diluents Glycidyl Phenyl Ether (GPE) obtained from TCI America with >99% purity and Cresyl Glycidyl Ether (CGE) obtained from Evonik under the trade name Epodil 742. N-Benzyldimethylamine (BDMA) was obtained from Alfa Aesar at >98% purity, 1,4-diazabicyclo[2.2.2]octane (DABCO) was obtained from TCI Chemicals at >98% purity, Bis-(2-dimethylaminoethyl)ether (BDMAEE) was obtained from Huntsman International under the trade name ZF-20, Stannous octoate was obtained from Sigma Aldrich at 92.5-100.0% purity. No special storage or handling procedures were employed nor were any further purification processes for any of these reagents.

Neat Resin Sample Preparation: The selected isocyanates for a chosen formulation were mixed using a vortex mixer and the catalytic epoxy was added to the solution. The mixture was further blended using a Fisher vortex mixer for 1 minute. The catalyst was then added to the mixture at a desired concentration and blended using the vortex mixer for 1 minute. The solution was subsequently centrifuged at 5,000 rpm for 2 minutes using a centrifuge to remove air introduced during mixing. Other common methods of degassing samples may also be used (i.e. vacuum pressure, sonication). The solution was then carefully added to silicon rubber molds made using XIAMETER® RTV-4230-E Silicone Rubber Kit supplied by Ellsworth Adhesives. The molds containing the reaction mixture were placed in an autoclave and pressurized to 100 psig then heated to the desired temperature and held at this temperature for a specified period of time before cooling to room temperature. Cured samples were cooled under pressure until the autoclave temperature falls below 80° C. and the cured polymer was removed from the autoclave. Samples cured in under 10 minutes were prepared such that the silicon mold were heated prior to adding the catalyzed reaction mixture then placed in the autoclave which was rapidly closed, pressurized and vented to enable the cured polymer to be removed from the autoclave in the specified cure time. The specimens were immediately removed from the molds.

Fracture Toughness: Samples for measuring the fracture toughness of the neat resin were prepared in accordance with ASTM Standard D5045—Plain Strain Toughness Testing of Polymers, specifically following the "notched beam" geometry. A Buehler ECOMET 3 variable speed grinder-polisher was used to remove surface imperfections as well as to ensure the test specimens fit geometric tolerances defined by the testing standard. The precrack was made using a slitting saw on a CNC milling machine followed by sharpening of the crack tip by sliding the sample over a fixed and unused razor blade a minimum of ten times. The razor blade was replaced after each specimen and a fixture was used to ensure uniform sharpening of the crack tip. The precracked sample was loaded in a 3-point bend testing apparatus attached to a Instron 3367 testing frame with a 30 kN load cell. Maximum load before the crack propagates through the sample was recorded and used for fracture toughness calculations. Averages and standard deviations were calculated based on sample sets of at least 5 specimens.

Tensile Specimens: Samples for measurement of the neat resin tensile strength and stiffness were prepared in accordance with ASTM Standard D638, specifically using the Type IV geometry. Samples were removed from their silicone rubber molds and polished to specifications using a Buehler ECOMET 3 variable speed grinder-polisher. The sides were polished using commercial-grade sandpaper by hand finally using 1500-grit wet/dry sandpaper for the final polish. Test specimens were mounted in Instron 50 kN wedge grips attached to a 30 kN load cell in an Instron 3367 test frame. Failure mode was analyzed to confirm proper and expected failure of the material occurred during testing and to ensure failure in the gauge section. The maximum load was recorded during testing and used to calculate tensile strength, initial slope for the stress-strain curve was used to calculate the tensile modulus, and crosshead extension was used to calculate strain to failure for each specimen. Averages and standard deviations were calculated based on sample sets of at least 5 specimens.

Water Bath Treatment: Neat resin samples were prepared according to the preceding procedure. Once they were removed from the autoclave and de-molded the specimens were submerged in a bath of RO-filtered water. The bath was covered loosely with a lid and placed in an oven at 80° C. for a period of 24 hours. The bath was then removed from the oven and, once cool, the samples were removed from the water bath. Samples were then prepared for testing according to the corresponding sample preparation procedure.

Humid Processing: Neat resin samples prepared according to the preceding procedure. Once they were removed from the autoclave and de-molded the specimens were placed in a saturated humid environment. This environment was created by placing an excess of liquid water in a Pyrex baking dish inside a laboratory vacuum oven. The oven was heated to 40° C. and completely sealed from the outside environment to allow the water to evaporate into the air and remain there. A humidity of about 100% was maintained inside the oven. The samples were subjected to this environment for 24-72 hours. Similar testing has been performed at atmospheric pressure in a controlled laboratory environment where the relative humidity was between 20 to 70% at 22° C.

Atmospheric Aging: Samples were aged in a laboratory with climate control. Relative humidity was not controlled.

Dynamic Mechanical Analysis. The glass transition temperature (Tg) of cured polymers and fiber reinforced polymer composites was measured using dynamic mechanical analysis (DMA) with the Tg specified as the peak of the Tan δ cure.

Comparative examples have been prepared to demonstrate some of the embodiments of this invention. Tables 1, 3 and 4 provide the constituents of the reaction mixture and the Reaction Conditions. Reactants for all examples prepared according to Neat Resin Test Samples procedure.

EXAMPLES 1-9

The formulation and cure conditions for Examples 1-9 are given in Table 1 and the corresponding material properties for all examples are provided in Table 2. Tensile strength, tensile stiffness and strain to failure were obtained according to ASTM D638 using the Type IV geometry while fracture toughness measured according to ASTM 5045 using the single edge notch beam specimen. Comparative Examples 1-9 demonstrate cure conditions of 180° C. for 12 hours and show various combinations of reactants can be used to achieve polymers with high mechanical strength, stiffness and toughness. Table 2 shows the glass transition temperature of the specimens following a 12 week aging at ambient conditions and demonstrate that very high Tg can be obtained.

This comparative example illustrates that contrary to expectation the presence of the aliphatic component can allow curing of the polymer at lower temperature. This result is further demonstrated by Examples 13 and 14 which use a 2 h cure at 110° C. and 120° C., respectively, and show that the mechanical properties increase with increasing reaction temperature and similar properties can be obtained without aliphatic isocyanates in the reaction mixture at 120° C.

TABLE 1

| Example | 1 | 2 | 3 | 4 | 5 | 6 | 7 | 8 | 9 |
|---|---|---|---|---|---|---|---|---|---|
| MONDOUR MLQ | | | 23 g | 20 g | | | | | 23 g |
| LUPRANATE MI | 23 g | 23 g | | | 19 g | 13.5 g | | 23 g | |
| MONDOUR MR LIGHT | 24.5 g | | | | 20.26 g | 33.58 g | 47.5 g | 24.5 g | |
| LUPRANATE M20 | | 24.5 g | 24.5 g | 21.32 g | | | | | 24.5 g |
| TDI | | | | 3.09 g | | | | | |
| DESMODOR N3400 | | | | | 6.47 g | | | | |
| EPON 828 | 0.9 g | 0.9 g | 0.9 g | 0.9 g | 0.9 g | 0.9 g | 0.9 g | 0.9 g | 0.9 g |
| BDMA | 0.9 g | 0.9 g | 0.9 g | 0.9 g | 0.9 g | 0.9 g | 0.9 g | 0.9 g | 0.9 g |
| Stannous Octoate | | | | | | | | 0.45 g | |
| H$_2$O @ 80° C. | | | | | | | | 24 h | 24 h |
| Cure Conditions | 180° C. for 12 h | 180° C. for 12 h | 180° C. for 12 h | 180° C. for 12 h | 180° C. for 12 h | 180° C. for 12 h | 180° C. for 12 h | 180° C. for 12 h | 180° C. for 12 h |

TABLE 2

| Ex | Tensile Strength (MPa) | Tensile Modulus (GPa) | Strain to Failure | K$_{1c}$ Fracture Toughness (MPa√m) | Tg (° C.) Following 12 week ambient Aging |
|---|---|---|---|---|---|
| 1 | 106 ± 14.2 | 3.82 ± 0.13 | 0.037 ± 0.009 | 0.926 ± 0.310 | 376.4 |
| 2 | 103 ± 7.80 | 3.74 ± 0.03 | 0.037 ± 0.005 | 0.991 ± 0.209 | 377.6 |
| 3 | 104 ± 2.89 | 3.53 ± 0.17 | 0.038 ± 0.004 | 0.985 ± 0.325 | 384.5 |
| 4 | 105 ± 12.4 | 3.91 ± 0.08 | 0.034 ± 0.005 | 0.879 ± 0.091 | 375 |
| 5 | 120 ± 9.76 | 3.40 ± 0.22 | 0.048 ± 0.006 | 0.883 ± 0.258 | 360 |
| 6 | 104 ± 8.28 | 3.39 ± 0.13 | 0.038 ± 0.006 | 0.944 ± 0.224 | ~~ |
| 7 | 100 ± 1.90 | 3.90 ± 0.04 | 0.032 ± 0.002 | 0.847 ± 0.134 | 347 |
| 8 | 97.9 ± 9.41 | 3.30 ± 0.25 | 0.038 ± 0.008 | 0.861 ± 0.189 | |
| 9 | 72.8 ± 23.4 | 3.50 ± 0.02 | 0.025 ± 0.010 | 0.681 ± 0.131 | 380 |

EXAMPLES 10-23

The formulation and cure conditions for Examples 10-16 are given in Table 3 and for Examples 17-22 are given in Table 4 the corresponding material properties for all examples are provided in Table 5. Tensile strength, tensile stiffness and strain to failure were obtained according to ASTM D638 using the Type IV geometry while fracture toughness measured according to ASTM 5045 using the single edge notch beam specimen. Comparative Examples 10-16 demonstrate a cured composition can be obtained through reduced temperature cure conditions and comparative Examples 17-22 demonstrate a cured composition having high performance characteristics can be obtained in under 5 minutes. Comparative Example 10 includes the isocyanurate of hexamethylene diisocyanate (Wannate HT-100), while comparative Example 11 includes the uretdione of hexamethylene diisocyanate (DESMODUR N3400) cured at 85° C. for 2 hours and show that excellent mechanical properties can be obtained, however comparative Example 12 omits the aliphatic component and under the same cure conditions achieves a brittle polymer with limited strength. Aliphatic isocyanates are known to have lower reactivity than aromatic isocyanates and therefore the expectation would be that the presence of the aliphatic component in the reaction mixture would slow the reaction.

Comparative Example 15 shows the use of DABCO dissolved in BDMA at a weight ratio of 1:5 as a catalyst, while comparative Example 16 shows that increased cure temperature can further improve mechanical properties. Comparative Examples 17 and 18 demonstrate the reaction mixture of this invention can be cured in as little as 5 minutes while achieving similar mechanical properties as those cured at lower temperature for extended time. Examples 19-23 use a catalyst solution of DABCO dissolved in a suitable solvent. Examples 19-23 use a solution of 1:3 by weight of DABCO:benzonitrile. Comparative Examples 19 and 20 demonstrate the reaction mixture of this invention can be cured in as little as 3 minutes while achieving similar mechanical properties as those cured at lower temperature for extended time. Example 21 demonstrates the reaction mixture of this invention can be cured in as little as 2 minutes at 160° C. while achieving similar mechanical properties as those cured at lower temperature for extended time. Example 22 demonstrates the reaction mixture can be cured at 120° C. in 5 minutes and Example 23 demonstrates the reaction mixture can be cured at 130° C. in 3 minutes while achieving similar mechanical properties as those cured at higher temperature.

EXAMPLE 24

The reaction mixture was infused into a fibrous reinforcement and has been demonstrated through the preparation of fiber reinforced composites specimens. Vacuum assisted resin transfer molding (VARTM) was employed to infuse the reaction mixture of Example 20 into 8 plies of 12 k Mitsubishi Grafil carbon fiber unidirectional carbon tape with an aerial weight of 373 gsm. The VARTM process was allowed to be completed over a period of a 2-10 minutes before curing the panels in the autoclave at 100 psi for 3 minutes at 170° C. or in a hot press at 170° C. for 3 minutes. After inserting the composite in the autoclave it was sealed and immediately pressurized reaching 100 psi approximately 90 seconds after incorporating the vacuum bagged composite and then held at pressure for approximately 15 seconds before venting such that the autoclave door could be opened and the composite removed after 180 seconds at temperature. After removal from the autoclave the cured composite was immediately removed from the flat plate and vacuum bag then allowed to cure under ambient conditions. This process was meant to simulate high pressure resin transfer molding (HP-RTM) processing and demonstrated the cure of a cold resin in 3 minutes whereas high pressure injection systems allow the resin to be heated prior to introduction to the mold which would greatly accelerate the cure. The composite's short beam strength was tested in accordance with ASTM 2344 and showed a high short beam strength of 69.0±3.68 MPa.

when submerged in water. Table 6 shows the glass transition temperature (Tg) of select examples before and after aging at ambient pressure and humidity, aging at elevated temperature and elevated humidity and following submersion in hot water. In each example the results show the cured composition experiences a greatly improved glass transition temperature. Prior art polymer primarily exhibit a decrease in glass transition when subject to moisture. However the cured composition of the present invention here experiences a substantive increase in its glass transition temperature as is

TABLE 3

| Ex | MONDOUR MRS | PAPI 20 | LUPRANATE M20 | Wannate HT-100 | DESMODOR N3400 | EPON 828 | BDMA | BDMAEE | DABCO | Cure Conditions |
|---|---|---|---|---|---|---|---|---|---|---|
| 10 | 40 g | | | 9.6 g | | 1 g | | | 0.4 g | 85° C. for 2 h |
| 11 | 40 g | | | | 6.4 g | 1 g | | 0.8 g | | 85° C. for 2 h |
| 12 | 45 g | | | | | 1 g | | 0.8 g | | 85° C. for 2 h |
| 13 | 45 g | | | | | 0.5 g | | 0.2 g | | 110° C. for 2 h |
| 14 | | | 45 g | | | 0.5 g | | 0.2 g | | 120° C. for 2 h |
| 15 | 45 g | | | | | 1 g | 1 g | | 0.2 g | 120° C. for 2 h |
| 16 | 40 g | | | | 6.4 g | 1 g | 1 g | | 0.2 g | 180° C. for 4 h |

TABLE 4

| Ex | MONDOUR MRS | PAPI 20 | LUPRANATE M20 | DESMODOR N3400 | EPON 828 | GPE | CGE | BDMAEE | DABCO Solution | Cure Conditions |
|---|---|---|---|---|---|---|---|---|---|---|
| 17 | 40 g | | | 6.4 g | 1 g | | | 0.8 g | | 160° C. for 5 min |
| 18 | | 45 g | | | 1 g | | | 0.8 g | | 160° C. for 5 min |
| 19 | | | 20 g | | | 0.4 g | | | 0.408 g | 170° C. for 3 min |
| 20 | | | 20 g | | | | 0.4 g | | 0.408 g | 170° C, for 3 min |
| 21 | | | 20 g | | | 0.4 g | | | 0.408 g | 160° C, for 2 min |
| 22 | | | 20 g | | | | 0.4 g | | 0.408 g | 120° C, for 5 min |
| 23 | | | 20 g | | | | 0.4 g | | 0.408 g | 130° C, for 3 min |

TABLE 5

| Ex | Tensile Strength (MPa) | Tensile Modulus (GPa) | Strain to Failure | $K_{Ic}$ Fracture Toughness (MPa √m) |
|---|---|---|---|---|
| 10 | 87.7 ± 1.54 | 2.86 ± 0.14 | 0.050 ± 0.003 | 0.620 ± 0.335 |
| 11 | 104.2 ± 3.5 | 3.4 ± 0.17 | 0.046 ± 0.005 | 0.963 ± 0.085 |
| 12 | 45.7 ± 9.8 | 3.6 ± 0.04 | 0.136 ± 0.003 | 0.291 ± 0.207 |
| 13 | 85.2 ± 19.2 | 3.6 ± 0.16 | 0.028 ± 0.009 | 0.719 ± 0.209 |
| 14 | 98.6 ± 6.6 | 3.75 ± 0.15 | 0.033 ± 0.004 | 1.20 ± 0.134 |
| 15 | 99.45 ± 3.6 | 3.57 ± 0.11 | 0.038 ± 0.003 | 1.09 ± 0.138 |
| 16 | 111.18 ± 10.9 | 3.53 ± 0.12 | 0.042 ± 0.009 | 0.935 ± 0.105 |
| 17 | 92.05 ± 2.8 | 3.2 ± 0.11 | 0.051 ± 0.006 | 1.09 ± 0.361 |
| 18 | 95.3 ± 5.31 | 3.68 ± 0.09 | 0.036 ± 0.004 | 0.605 ± 0.139 |
| 19 | 99.86 ± 9.125 | 4.64 ± 0.06 | 0.032 ± 0.003 | 1.254 ± 0.122 |
| 20 | 111.1 ± 9.99 | 4.69 ± 0.140 | 0.033 ± 0.001 | 0.667 ± 0.091 |
| 21 | 102.3 ± 8.29 | 3.79 ± 0.176 | 0.044 ± 0.009 | 0.611 ± 0.026 |
| 22 | 97.21 ± 5.30 | 4.5 ± 0.0716 | 0.0315 ± 0.002 | 0.574 ± 0.0535 |
| 23 | 100.65 ± 9.40 | 4.59 ± 0.097 | 0.0321 ± 0.007 | 0.626 ± 0.0574 |

In one embodiment of this invention, the cured composition develops a greatly increased glass transition temperature upon aging in the presence of atmospheric moisture or exhibited in Table 6 below. The results are, quite remarkably, contrary to conventional teachings.

TABLE 6

| Ex | Atmospheric Aging | Post Cure at 40° C. in 100% Humidity | Post Cure submerged in ambient pressure $H_2O$ at 80° C.(° C.) | Tg following thermal cure (° C.) | Tg following post cure (° C.) |
|---|---|---|---|---|---|
| 1 | 3 months | | | 225° C. | 376° C. |
| 3 | 3 months | | | 285° C. | 384° C. |
| 7 | 2 months | | | 239° C. | 347° C. |
| 8 | | 24 hours | | 232° C. | 360° C. |
| 9 | | 24 hours | | 229° C. | 374° C. |
| 10 | | 72 hours | | 196° C. | 345° C. |
| 10 | | | 24 hours | 196° C. | 358° C. |
| 10 | 90 days | | | 196° C. | 356° C. |
| 11 | 50 days | | | 163° C. | 366° C. |
| 11 | | 24 hours | | 163° C. | 352° C. |
| 11 | | | 24 hours | 163° C. | 342° C. |
| 12 | | | 24 hours | 185° C. | 345° C. |

TABLE 6-continued

| Ex | Atmospheric Aging | Post Cure at 40° C. in 100% Humidity | Post Cure submerged in ambient pressure H₂O at 80° C. (° C.) | Tg following thermal cure (° C.) | Tg following post cure (° C.) |
|---|---|---|---|---|---|
| 15 | 50 days | | | 197° C. | 327° C. |
| 16 | 3 months | | | 164° C. | 356° C. |
| 21 | 60 days | | | 195.5° C. | 354.2° C. |
| 24 | 65 days | | | 209.3° C. | 335.1° C. |

Obviously, many modifications and variations of the present invention are possible in light of the above teachings foregoing invention has been described in accordance with the relevant legal standards; thus, the description is merely exemplary rather than limiting in nature. Variations and modifications to the disclosed embodiment may become apparent to those skilled in the art and do come within the scope of the invention. Accordingly, the scope of the legal protection afforded this invention can only be determined by studying the following claims.

What is claimed is:

1. A method of making an isocyanurate based polymer, consisting essentially of the steps of:
providing a liquid aromatic polyisocyanate;
providing a trimerization catalyst;
said aromatic polyisocyanate comprising of a combination of methylene diphenyl diisocyanate (MDI) and polymeric methylene diphenyl diisocyanate (pMDI) providing said aromatic polyisocyanate with an average functionality of greater than 2;
forming a reaction mixture being substantially free of reactive hydrogen by mixing a catalytic amount of at least one epoxide with said aromatic polyisocyanate and mixing said trimerization catalyst with said reaction mixture; said trimerization catalyst consisting essentially of at least one of amine catalysts, organometallic compounds, imidazole compounds, said at least one epoxide being monofunctional or polyfunctional; and
curing said reaction mixture to produce a polymer composition being substantially free of urethane and amide groups and including a reaction product of two or more isocyanates.

2. The method set forth in claim 1, wherein said step of providing said aromatic polyisocyanate with a functionality of greater than 2 is further defined by providing said aromatic polyisocyanurate with an average functionality of greater than about 2.5.

3. The method set forth in claim 1, wherein said catalytic amount of epoxide is provided in a proportion to a total reaction mixture by weight percent of up to about 7%.

4. The method set forth in claim 1, wherein said catalytic amount of epoxide is provided in a proportion to a total reaction mixture by weight percent of about 3%.

5. The method set forth in claim 1, wherein said reaction mixture is further defined by isocyanate terminated prepolymers including at least one of, uretdione groups, biuret groups, allophanate groups, isocyanurate groups or carbodiimide groups.

6. The method set forth in claim 1, wherein said reaction mixture includes a weight percent of 5-20% of at least one of uretdione of hexamethylene diisocyanate and a trimer of hexamethylene diisocyanate relative to a total weight of said reaction mixture.

7. The method set forth in claim 1, wherein said polymer composition obtains a glass transition temperature greater than about 350° C. following ambient aging.

8. The method set forth in claim 1, wherein said at least one epoxide is mixed in said reaction mixture prior to providing said trimerization catalyst thereby forming a storage stable mixture for catalyzation with said trimerization catalyst at future time.

9. The method set forth in claim 1, wherein said reaction product includes a fracture toughness greater than about 0.5 MPa·m$^{1/2}$ according to ASTM Standard D5045.

10. The method set forth in claim 1, wherein said step of curing said reaction product is further defined by thermal curing said reaction mixture in under 10 minutes.

11. The method set forth in claim 1, wherein said step of curing said reaction product is further defined by thermal curing said reaction mixture at less than 120° C. in under 5 minutes.

12. The method set forth in claim 1, wherein said step of curing said reaction product is further defined by thermal curing said reaction mixture at less than 170° C. in under 2 minutes.

13. The method set forth in claim 1, wherein said step of curing said reaction product is further defined by thermal curing said reaction mixture at less than 170° C. in under 1 minute.

14. The method set forth in claim 1, wherein said liquid aromatic polyisocyanurate includes a viscosity below 2,500 mPa·s at room temperature.

15. The method set forth in claim 1, wherein said liquid aromatic polyisocyanurate includes a viscosity below 150 mPa·s at 50° C.

16. The method set forth in claim 1, wherein said step of mixing a catalyst to said reaction mixture is further defined by mixing at least one of Bis-(2-dimethylaminoethyl) ether (BDMAEE), N,N-Dimethylbenzylamine (BDMA) or 1,4-diazabicyclo [2.2.2] octane (DABCO or TEDA).

17. The method set forth in claim 1, wherein said step of mixing a catalytic amount of epoxide with said liquid aromatic polyisocyanate is further defined by mixing less than about 10% by weight of epoxide of a total weight of said reaction mixture.

18. The method set forth in claim 1, wherein said step of curing said reaction mixture is further defined by heating said reaction mixture to less than 120° C. for less than five minutes thereby curing said reaction mixture.

19. The method set forth in claim 1, wherein said isocyanurate based polymer obtains a glass transition temperature greater than 300° C. after aging at ambient temperature and pressure.

20. The method set forth in claim 1, wherein said epoxide is provided in a proportion to a total reaction mixture by weight percent between 0.1 and 10%.

21. A method of making an isocyanurate based polymer, consisting essentially of the steps of:
providing a liquid aromatic polyisocyanate;
providing a trimerization catalyst;
said aromatic polyisocyanate comprising of a combination of methylene diphenyl diisocyanate (MDI) and polymeric methylene diphenyl diisocyanate (pMDI) providing said aromatic polyisocyanate with an average functionality of greater than 2;
forming a reaction mixture being substantially free of reactive hydrogen by mixing a catalytic amount of at least one epoxide with said aromatic polyisocyanate and mixing said trimerization catalyst with said reaction mixture; said trimerization catalyst consisting essentially of at least one of amine catalysts, organometallic compounds, imidazole compounds, said at least one epoxide being monofunctional or polyfunctional;

providing an aliphatic polyisocyanate of hexamethylene diisocyanate to said reaction mixture including at least one of uretidione, isocyanurate, biuret, allophanate or iminooxadiazinedione; and curing said reaction mixture to produce a polymer composition being substantially free of urethane and amide groups and including a reaction product of two or more isocyanates.

22. A method of making an isocyanurate based polymer, consisting essentially of the steps of:

providing a liquid aromatic polyisocyanate;

providing a trimerization catalyst;

said aromatic polyisocyanate comprising of a combination of methylene diphenyl diisocyanate (MDI) and polymeric methylene diphenyl diisocyanate (pMDI) providing said aromatic polyisocyanate with an average functionality of greater than 2;

forming a reaction mixture being substantially free of reactive hydrogen by mixing a catalytic amount of at least one epoxide with said aromatic polyisocyanate and mixing said trimerization catalyst with said reaction mixture; said trimerization catalyst consisting essentially of at least one of amine catalysts, organometallic compounds, imidazole compounds, said at least one epoxide being monofunctional or polyfunctional;

curing said reaction mixture to produce a polymer composition being substantially free of urethane and amide groups and including a reaction product of two or more isocyanates; and wherein said polymer composition is post cured in one of a humid environment, or an aqueous solution or aged at an ambient temperature and pressure in an environment including atmospheric moisture.

23. A method of making an isocyanurate based polymer, consisting essentially of the steps of:

providing a liquid aromatic polyisocyanate;

providing a trimerization catalyst;

said aromatic polyisocyanate comprising of a combination of methylene diphenyl diisocyanate (MDI) and polymeric methylene diphenyl diisocyanate (pMDI) providing said aromatic polyisocyanate with an average functionality of greater than 2;

forming a reaction mixture being substantially free of reactive hydrogen by mixing a catalytic amount of at least one epoxide with said aromatic polyisocyanate and mixing said trimerization catalyst with said reaction mixture; said trimerization catalyst consisting essentially of at least one of amine catalysts, organometallic compounds, imidazole compounds, said at least one epoxide being monofunctional or polyfunctional;

curing said reaction mixture to produce a polymer composition being substantially free of urethane and amide groups and including a reaction product of two or more isocyanates; and infusing a fibrous material with said reaction mixture after catalyzing said reaction mixture and prior to heating said reaction mixture for curing a fiber reinforced composite reaction mixture.

* * * * *